(12) United States Patent
Sebastian et al.

(10) Patent No.: US 9,898,151 B2
(45) Date of Patent: Feb. 20, 2018

(54) CAPACITIVE TOUCH SCREEN SENSOR AND CORRESPONDING METHOD OF FABRICATION

(71) Applicant: 3M INNOVATIVE PROPERTIES COMPANY, St. Paul, MN (US)

(72) Inventors: Muthu Sebastian, Singapore (SG); Dominic M. Travasso, Singapore (SG); Steven T. Swartz, Pepperell, MA (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 14/760,769

(22) PCT Filed: Feb. 6, 2013

(86) PCT No.: PCT/US2013/024873
§ 371 (c)(1),
(2) Date: Jul. 14, 2015

(87) PCT Pub. No.: WO2014/123518
PCT Pub. Date: Aug. 14, 2014

(65) Prior Publication Data
US 2015/0363022 A1    Dec. 17, 2015

(51) Int. Cl.
*G06F 3/045* (2006.01)
*G06F 3/044* (2006.01)

(52) U.S. Cl.
CPC .... *G06F 3/044* (2013.01); *G06F 2203/04103* (2013.01); *G06F 2203/04111* (2013.01); *G06F 2203/04112* (2013.01)

(58) Field of Classification Search
CPC .......... G06F 3/044; G06F 2203/04103; G06F 2203/04111; G06F 2203/04112
See application file for complete search history.

(56) References Cited

U.S. PATENT DOCUMENTS 5,386,219 A    1/1995  Greanias
8,581,123 B2   11/2013 Ozeki et al.
(Continued)

FOREIGN PATENT DOCUMENTS

| CN | 101655758 | 2/2010 |
| CN | 102043548 | 5/2011 |
| KR | 2011-0125838 | 11/2011 |

OTHER PUBLICATIONS

International Search Report for PCT International Application No. PCT/US2013/024873 dated Nov. 1, 2013, 5 pages.

*Primary Examiner* — Peter D McLoone
(74) *Attorney, Agent, or Firm* — Clifton F. Richardson

(57) ABSTRACT

A capacitive touch screen sensor 104 is disclosed. The sensor 104 comprises an array of drive electrodes 100, an array of sense electrodes 102 separated from the array of drive electrodes by a dielectric layer 200, each sense electrode 102 being offset from each drive electrode 100 to define respective overlapping regions 112 and first non-overlapping regions 113, and a plurality of non-electrically connected electrodes 402, each non-electrically connected electrode 402 being arranged to correspond to each first non-overlapping region 113 and spaced from adjacent drive 100 or sense electrodes 102 by a perimeter gap 404. The perimeter gap 404 may have a width of about 100 um or less. A related touch panel and method of fabricating the same are also disclosed.

22 Claims, 6 Drawing Sheets

(56) References Cited

U.S. PATENT DOCUMENTS

| | | |
|---|---|---|
| 8,830,180 B2 | 9/2014 | Yilmaz et al. |
| 2008/0062148 A1 | 3/2008 | Hotelling |
| 2009/0096758 A1 | 4/2009 | Hotelling |
| 2009/0219258 A1 | 9/2009 | Geaghan |
| 2009/0315859 A1 | 12/2009 | Chien |
| 2010/0033443 A1* | 2/2010 | Hashimoto ........... G06F 3/0418 345/173 |
| 2010/0044122 A1 | 2/2010 | Sleeman |
| 2010/0328228 A1 | 12/2010 | Elias |
| 2011/0007020 A1 | 1/2011 | Hong |
| 2011/0113371 A1 | 5/2011 | Parker |
| 2011/0248953 A1 | 10/2011 | Lee |
| 2012/0062250 A1* | 3/2012 | Kuo ........................ G06F 3/044 324/686 |
| 2012/0090757 A1 | 4/2012 | Buchan |
| 2012/0098782 A1 | 4/2012 | Nam |
| 2012/0127387 A1 | 5/2012 | Yamato et al. |
| 2012/0287068 A1 | 11/2012 | Colgate |
| 2015/0062457 A1* | 3/2015 | Kida ........................ G06F 3/044 349/12 |

* cited by examiner

CAPACITIVE TOUCH SCREEN SENSOR AND CORRESPONDING METHOD OF FABRICATION

FIELD & BACKGROUND

The present invention relates to a capacitive touch screen sensor and corresponding method of fabrication.

In capacitive-type touch screen sensors, transparent rows and columns of conductive electrodes are patterned and coupled through a dielectric medium to obtain a matrix of electrodes. In this respect, patterns of transparent conductive materials, such as Indium Tin Oxide (ITO), Indium Zinc Oxide (IZO), Silver pattern and the like, are used to form the electrodes. For a quality touch sensor, it is important to achieve high transmittance, high conductivity and low visibility of electrode features.

In a typical patterning process, the conductive material is etched away from a substrate while keeping a desired pattern of conductive material on the substrate to create the matrix of electrodes. After the patterning process, the pattern typically becomes visible to the naked eye. To reduce visibility of the pattern, refractive index of the materials to fabricate the capacitive touch screen sensor may be selected in a way to get lower visibility. However, this method is expensive and requires precise control of material composition, thickness and process control.

It is an object of the present invention to provide a capacitive touch screen sensor and corresponding method of fabrication to address at least one of the problems of the prior art and/or to provide the public with a useful choice.

SUMMARY

According to a first aspect of the invention, there is provided a capacitive touch screen sensor comprising: (i) an array of drive electrodes, (ii) an array of sense electrodes separated from the array of drive electrodes by a dielectric layer, each sense electrode being offset from each drive electrode to define respective overlapping regions and first non-overlapping regions, and (iii) a plurality of non-electrically connected electrodes, each non-electrically connected electrode being arranged to correspond to each first non-overlapping region and spaced from adjacent drive or sense electrodes by a perimeter gap. The perimeter gap has a width of about 100 um or less.

In this embodiment, each drive electrode and sense electrode is connected to an electrical source. The layers comprising the drive and sense electrodes are sometimes referred to herein as electrically connected layers.

In this embodiment, non-electrically connected electrodes mean that these electrodes are electrically not connected or they are electrically/conductively isolated.

With such an arrangement, it provides a more reliable way of reducing electrode pattern visibility of the two arrays of drive and sense electrodes. Indeed, it has been found that such an arrangement provides best results in reducing the pattern visibility and yet ensuring that the non-electrically connected electrodes do not interfere with the operation of the electrically connected electrodes.

In at least one embodiment, the width may be between 20 um and 100 um. More preferably, the width may be about 30 um. Further, the array of drive electrodes and the array of sense electrodes may be arranged on opposing first and second surfaces of a same substrate. Yet further, the plurality of non-electrically connected electrodes may be arranged on one of the opposing surfaces. Alternatively, the plurality of non-electrically connected electrodes may be arranged on both of the opposing surfaces.

The plurality of non-electrically connected electrodes may be arranged on the same surface as the array of drive electrodes, and at least some of the plurality of non-electrically connected electrodes may include a supplemental portion which may be in registration with corresponding sense electrodes. Alternatively, the plurality of non-electrically connected electrodes may be arranged on the same surface as the array of sense electrodes, and at least some of the plurality of non-electrically connected electrodes may include a supplemental portion which may be in registration with corresponding drive electrodes.

In at least one embodiment, the array of drive electrodes and the array of sense electrodes may be arranged on surfaces of different substrates. Further, the plurality of non-electrically connected electrodes may be arranged on one of the surfaces, or the plurality of non-electrically connected electrodes may optionally be arranged on both of the surfaces. Moreover, the plurality of non-electrically connected electrodes may be arranged on the same surface as the array of drive electrodes and at least some of the plurality of non-electrically connected electrodes may include a supplemental portion which may be in registration with corresponding sense electrodes.

In at least one embodiment, the plurality of non-electrically connected electrodes may be arranged on the same surface as the array of sense electrodes, and at least some of the plurality of non-electrically connected electrodes may include a supplemental portion which may be in registration with corresponding drive electrodes.

Each non-electrically connected electrode may have a generally X-shape, wherein the perimeter gap is configured to space the generally X-shape non-electrically connected electrodes from adjacent drive or sense electrodes.

The drive and sense electrodes and the non-electrically connected electrodes may comprise one or more of Zinc Oxide (ZnO), Tin(II) Oxide (SnO), Indium Oxide (InO), Graphene, Indium Zinc Oxide (IZO), and Indium Tin Oxide (ITO). Preferably, separation distance between the array of drive electrodes and the array of sense electrodes is about 50 to 175 um.

In at least one embodiment, the non-electrically connected electrodes comprise a plurality of segmented non-electrically connected electrodes spaced from each other.

According to a second aspect of the invention, there is provided a capacitive touch sensitive device, comprising the capacitive touch screen sensor as described above.

According to a third aspect of the invention, there is provided a method of fabricating a capacitive touch screen sensor, comprising: (i) forming an array of drive electrodes, (ii) forming an array of sense electrodes separated from the array of drive electrodes by a dielectric layer, each sense electrode being offset from each drive electrode to define respective overlapping regions and first regions, and (iii) forming a plurality of non-electrically connected electrodes with each non-electrically connected electrode arranged to correspond to each first non-overlapping region and spaced from adjacent drive or sense electrodes by a perimeter gap. The perimeter gap has a width of about 100 um or less.

It should be apparent that features relating to one aspect of the invention may also be applicable to the other aspects of the invention.

These and other aspects of the invention will be apparent from and elucidated with reference to the embodiments described hereinafter.

BRIEF DESCRIPTION OF THE DRAWINGS

Embodiments of the invention are disclosed hereinafter with reference to the accompanying drawings, in which:

FIG. 3a is an enlarged view of a portion of a matrix sensor with non-electrically connected electrodes according to a first embodiment of the present invention and FIG. 3b is a further enlarged view of a portion of the matrix sensor illustrated in FIG. 3a;

FIGS. 5a and 5b are enlarged cross-sectional side views depicting various layers of test matrix sensors, modelled respectively after the embodiments of FIGS. 3a and 4a.

DETAILED DESCRIPTION

Figure 1A:
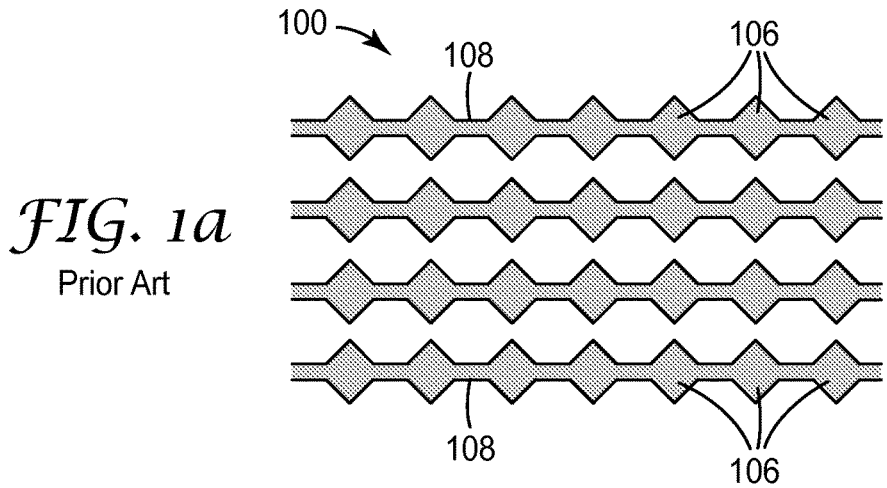
FIGS. 1a and 1b illustrate respectively prior art arrays of drive electrodes and sense electrodes.
Figure 1B:
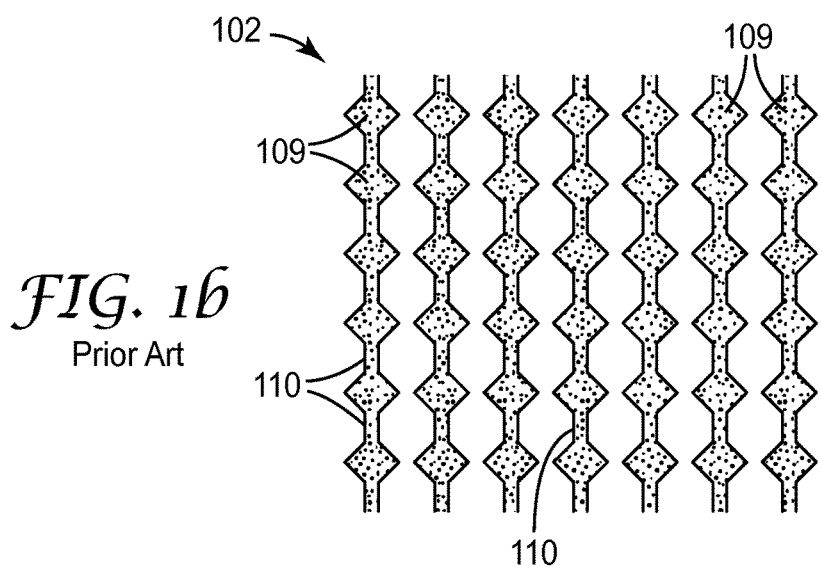

FIGS. 1a and 1b respectively show an array of drive electrodes 100 and an array of sense electrodes 102 which are known in the art. The array of drive electrodes 100 comprises a plurality of horizontally arranged rows of conductive pads 106, and each horizontal row of conductive pads 106 is equally spaced from neighbouring horizontal rows of conductive pads 106. Each conductive pad 106 is of a generally diamond shape. Further, the conductive pads 106 of each horizontal row are electrically connected to conductive drive lines 108.

The array of sense electrodes 102 comprises a plurality of vertically arranged columns of conductive pads 109, which are connected with one another via conductive sense lines 110. That is, the array of sense electrodes 102 differs from the array of drive electrodes 100 in that the former 102 comprises vertically arranged columns of conductive pads 109 while the latter comprises horizontally arranged rows of conductive pads 106. The vertically arranged columns and horizontally arranged rows are typically orthogonally oriented with respect to each other. It should be appreciated that the conductive pads 109 and drive lines 108 of the array of sense electrodes 102 are structurally similar to the conductive pads 106 and sense lines 110 of the array of drive electrodes 100. In this embodiment, the conductive pads 106, 109, drive lines 108, and sense lines 110 are formed from Indium Tin Oxide (ITO). However, it should be appreciated that other suitable materials may also be used for example, Zinc Oxide (ZnO), Tin(II) Oxide (SnO), Indium Oxide (InO), Indium Zinc Oxide (IZO), and Graphene.

Figure 1C:
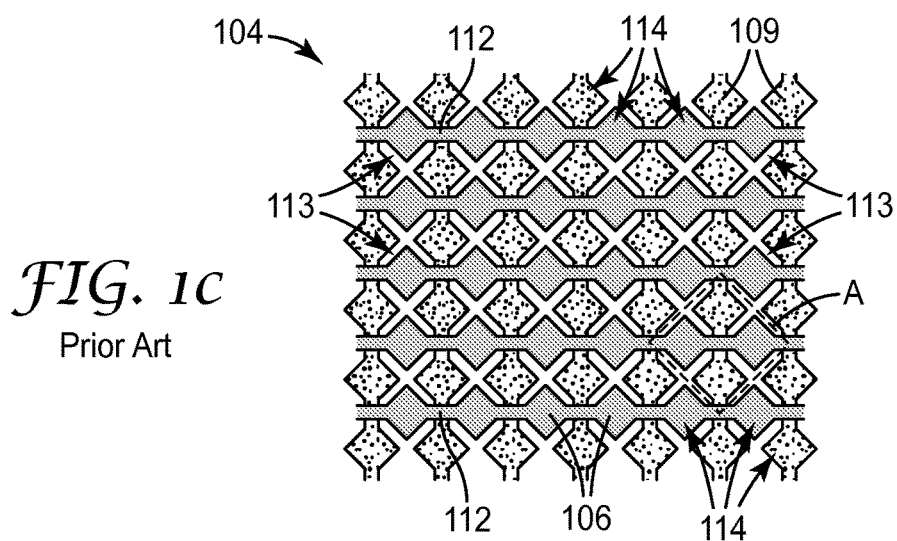
FIG. 1c is a prior art matrix sensor formed from the array of drive electrodes and the array of sense electrodes of FIGS. 1a and 1b.

FIG. 1c is a prior art matrix sensor 104 (or more generally a capacitive touch screen sensor) formed by the array of drive electrodes 100 and the array of sense electrodes 102 being overlaid one over the other and separated from each other to form a capacitive touch sensor area which can be adopted for the screens of capacitive touch sensitive devices (e.g. smartphones, or tablet computers etc). It would be appreciated that the array of drive electrodes 100 and the array of sense electrodes 102 are electrically connected to a control circuitry (not shown) to process signals received from the drive and sense electrodes 100,102.

It should be appreciated that there are numerous way of fabricating the matrix sensor 104. For example, the array of drive electrodes 100 and the array of sense electrodes 102 may be formed on opposing surfaces of a same substrate. In this case, a flexible transparent substrate such as PET may be used and patterned to form the array of drive and sense electrodes. The patterning may be carried out using ink printing and lifting process, photolithography, wet chemical etching or printing process. In the alternative, the array of drive electrodes 100 and the array of sense electrodes 102 may be formed on separate substrates and laminated together (using optically clear adhesive) to form the matrix sensor 104. The lamination may be carried out using processes such as Face-in, Face-out and Face in-out, which is described in U.S. Pat. No. 5,386,219. In this respect, because the two substrates are laminated together, this may result in a number of permutations in relation to configuration of the different layers of the matrix sensor 104. Taking the example of layers of Indium Tin Oxide (ITO), polyethylene terephthalate (PET), and optically clear adhesive (OCA), the permutations may be:

i) Face-in: PET-ITO-OCA-ITO-PET;
 ii) Face-out: ITO-PET-OCA-PET-ITO; or
 iii) Face in-out: ITO-PET-OCA-ITO-PET.

In this prior art matrix sensor 104, specifically the array of drive electrodes 100 and the array of sense electrodes 102 are formed on opposing surfaces of a polyethylene terephthalate (PET) substrate 200 by photolithography with the array of drive electrodes 100 and the array of sense electrodes 102 arranged offset with one another to form overlapping regions 112 and first and second non-overlapping regions 113, 114 to form the matrix sensor 104. Specifically, disposition of the array of drive electrodes 100 and the sense electrodes 102 is performed in a way so that the conductive pads 106,109 of the respective arrays do not overlap with each other and thus, these are the first and second non-overlapping regions 113, 114. In the first non-overlapping regions, neither conductive pad 106, 109 is present. In the second non-overlapping regions, only one conductive pad 106, 109 is present. Further, portions of the conductive drive lines 108 and the conductive sense lines 110 are arranged to overlap with each other to form the overlapping regions 112.

Figure 1D:
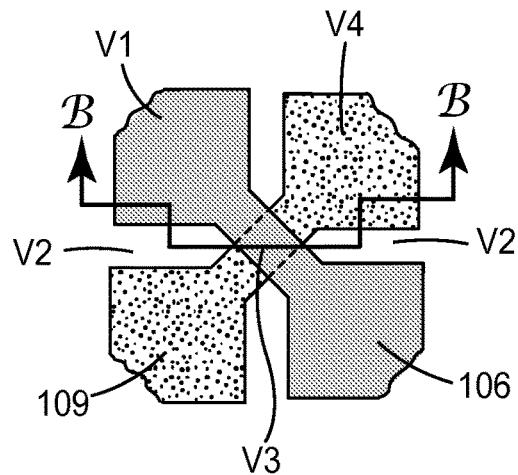
FIG. 1d is an enlarged view of portion A of the prior art matrix sensor of FIG. 1c.
Figure 2:
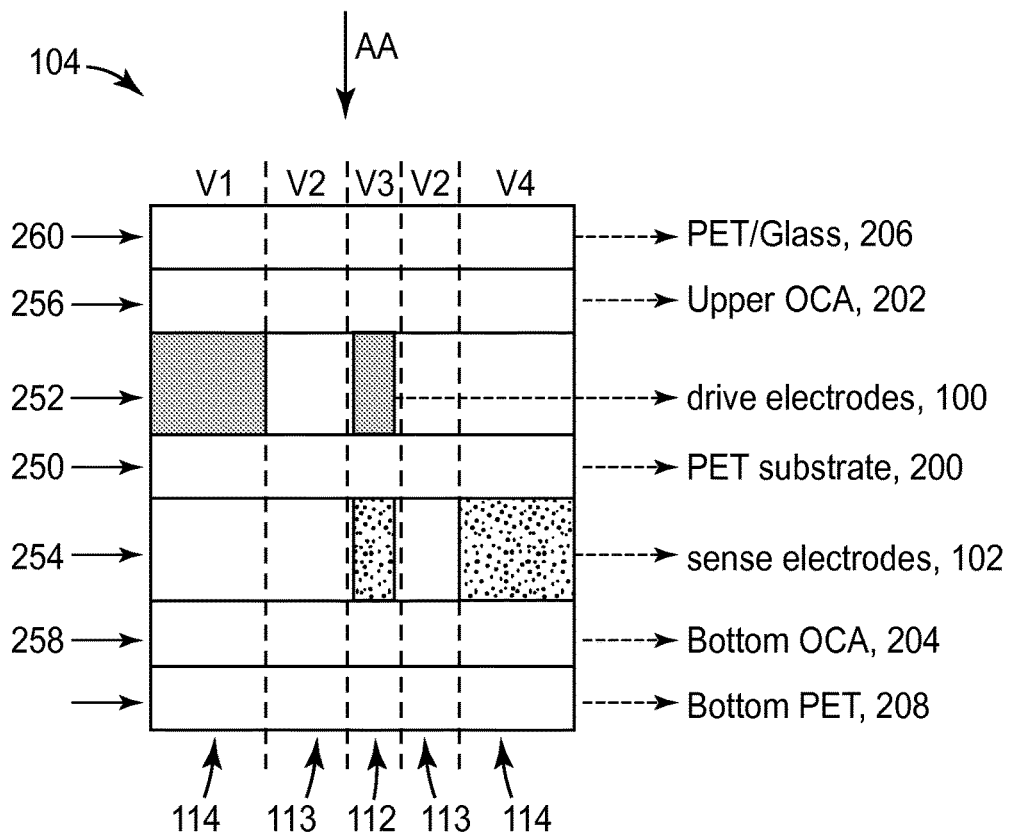
FIG. 2 is a cross sectional side view of the portion A in the direction BB of FIG. 1d.

FIG. 1d is an enlarged view of portion A of the prior art matrix sensor 104 of FIG. 1c and FIG. 2 is a cross-sectional view of the portion A of FIG. 1d in the direction B-B to illustrate the overlapping regions 112 and first and second non-overlapping regions 113, 114 more clearly.

Specifically, the matrix sensor 104 includes a number of layers namely, a dielectric layer 250 which is formed by the PET substrate 200, a first electrically connected layer 252 which includes the array of drive electrodes 100 and a second electrically connected layer 254 which includes the array of sense electrodes 102 with the first electrically connected layer 252 and the second electrically connected layer 254 arranged to sandwich the dielectric layer 250. Preferably, the dielectric layer 250 is between approximately 50 um and 175 um thick (i.e. the equivalent separation distance between the drive and sense electrodes 100, 102) and thus, the array of drive and sense electrodes 100, 102 are electrically isolated. Further, the matrix sensor 104 includes two intermediate layers 256,258 arranged to be laid over the first and second electrically connected layers 252,254 respectively. The two intermediate layers 256,258 comprise an upper optically clear adhesive (OCA) 202 and a bottom OCA 204. Preferably, the OCA 202,204 is a pressure sensitive adhesive with high light transmittance of >90%. Finally, the prior art matrix sensor 104 includes a top layer 260 comprising PET or glass 206, and a bottom layer 262 comprising PET 208. It should be mentioned that the layers of the matrix sensor 104 are not shown to scale.

As it may be appreciated by looking at FIG. 2, in the direction of arrow AA, the first non-overlapping regions 113 include portions V2, the second non-overlapping regions 114 include portions V1 and V4, and the overlapping region 112 includes portion V3 (i.e. part of the drive electrodes 100 overlaps with part of the sense electrodes 102). It should also be appreciated that because each layer 250,252,254,256,258, 260,262 is not configured similarly with another layer, light transmittance through these layers would also differ. For example, the V1 portion includes the PET 206, the upper OCA 202, drive electrodes 100, the substrate 200, the bottom OCA 204, and the bottom PET 208. In contrast, the V2 portion then includes the PET 206, the upper OCA 202, the bottom OCA 204 and the bottom PET 208.

Specifically, from a top plan view as seen from the direction of the arrow AA, the portions V1, V2, V3, V4 would create different optical characteristics for the user and as an example, these portions may have optical properties listed in Table 1 below:

TABLE 1

Optical parameters for the four view areas V1-V4

| View area | L | a | b | T % at 550 nm | R % at 550 nm |
| --- | --- | --- | --- | --- | --- |
| V1 | 95.40 | −0.39 | 5.74 | 86.30 | 9.31 |
| V2 | 96.86 | −0.14 | 3.28 | 87.85 | 8.82 |
| V3 | 94.03 | −0.21 | 7.02 | 84.77 | 10.12 |
| V4 | 95.25 | −0.39 | 5.80 | 86.30 | 9.31 |

It should be appreciated that parameters "L", "a" and "b" in Table 1 are parameters L*a*b* of the CIE colour scale/space in which:

i) "L" represents lightness;
ii) "a" represents a position on the green-red axis; and
iii) "b" represents a position on the blue-yellow axis.

Values shown in Table 1 were measured using Konica MINOLTA CM-3600d which conforms to CIELAB colour space (1976) and ASTM D1003-2007 International Standards. For example, the V2 portion may possess higher transmittance (T) having a value of "87.85%", with a lower "b" parameter value of "3.28" as compared to the other three portions V1, V3 and V4. On the other hand, the V3 portion comprises Indium Tin Oxide (ITO) (i.e. the drive and sense electrodes 100,102) and upper and bottom OCA 202,204 on both sides of the substrate 200, the PET 206 and the bottom PET 208 possess lower transmittance having a value of "84.77%", with a higher "b" parameter value of 7.02 as compared to the other parts, which results in greater visibility of the pattern formed in the V3 portion to users. In other words, the pattern is visible due to the contrast between the V2 portion and the other portions (i.e. V1, V3 and V4).

It is to be appreciated that to reduce visibility of these patterns in the prior art matrix sensor 104, the four portions V1, V2, V3 and V4 may be configured to have substantially uniform optical properties. Further, a unit area of each of the four portions V1, V2, V3 and V4 is to be adjusted to minimize the optical variation. Specifically, the portions V1, V3 and V4 may be fabricated to be larger and nearer to each other to minimise the contrast with the V2 portion. As a further example, sizes (areas) of the conductive pads 106, 109 which are arranged in both the V1 and V4 portions may be increased to minimise the area that form the V2 portion. Moreover, the separation of any two adjacent conductive pads 106, 109 needs to be arranged in a manner to reduce the effects of undesirable stray capacitance which affects the touch performance provided by the matrix sensor 104. These may not be optimal ways to solve the problem.

Figure 3A:
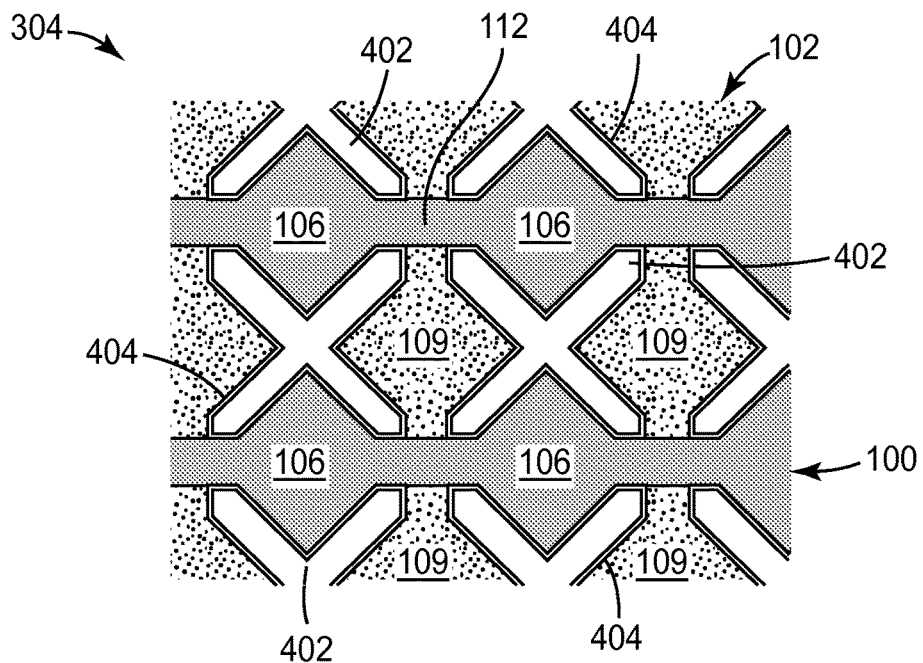
Figure 3B:
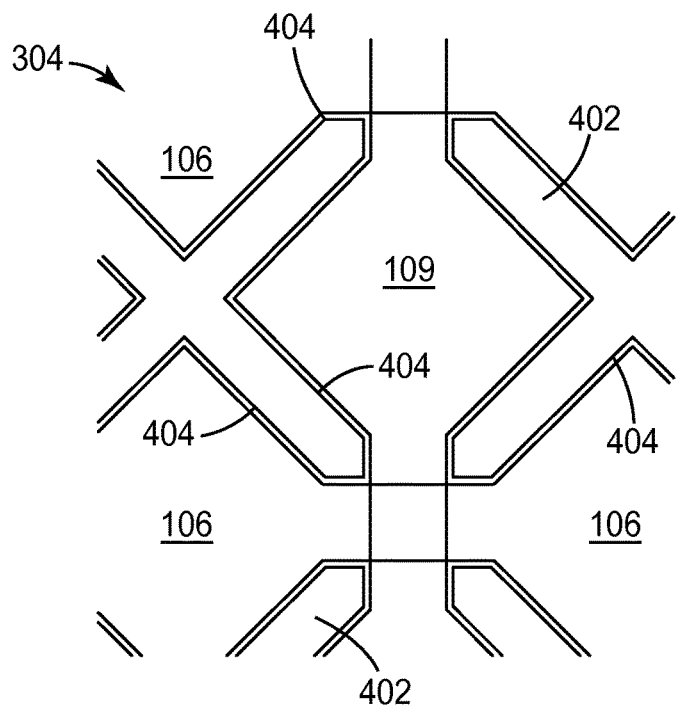

FIG. 3a is an enlarged view of a portion of a matrix sensor 304 of a first embodiment of the present invention. It should be mentioned that the matrix sensor 304 has a number of features similar to those of the matrix sensor 104 of FIG. 1c and like parts will share the same references. FIG. 3b is a further enlarged view of a portion of the matrix sensor illustrated in FIG. 3a. Specifically, the matrix sensor 304 further comprises non-electrically connected electrodes 402 at the first non-overlapping regions 113 and the non-electrically connected electrodes 402 are formed using photolithography just like forming the drive and sense electrodes 100,102. In the first embodiment, the non-electrically connected electrodes 402 are disposed in the first electrically connected layer 252 which is the same layer as the array of drive electrodes 100. In this embodiment, the non-electrically connected electrodes 402 correspond to the V2 portions of first electrically connected layer 252, have a generally X-shape and are formed of the same material, thickness and refractive index as the electrically connected electrodes or the drive and sense electrodes 100, 102 as so to minimise any visible contrast between the non-electrically connected and electrically connected electrodes 402, 100, 102.

Each non-electrically connected electrode 402 is separated from adjacent conductive pads 106 of the drive electrodes 100 by a perimeter gap 404 so that the non-electrically connected electrodes 402 are not electrically connected to the conductive pads 106. The perimeter gap 404 preferably needs to be formed as narrow as possible in order to minimise visibility thereby achieving the best optical characteristics, without affecting or interfering with the normal operation of the touch sensor or production yield due to defects causing the non-electrically connected electrodes to contact the electrically connected electrode, and it has been found that a width of about 100 um or less is preferred. Particularly, the width of the perimeter 404 is approximately between 20 um and 100 um, or the width may be between 25 um and 90 um. In this exemplary embodiment, the width is approximately 30 um wide.

Further embodiments of the invention will be described hereinafter. For the sake of brevity, description of like elements, functionalities and operations that are common between the embodiments are not repeated and the same reference numerals will be used.

Figure 4A:
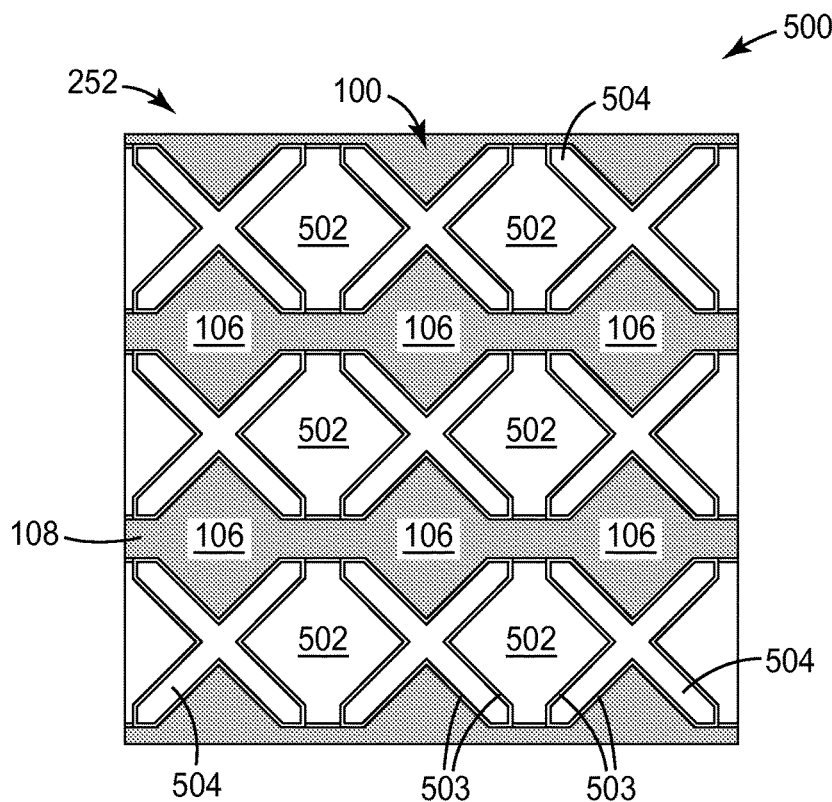
FIGS. 4a and 4b are enlarged plan views of first and second electrically connected layers of a capacitive touch sensor which includes non-electrically connected electrodes and supplemental non-electrically connected electrode portions according to a second embodiment of the present invention.
Figure 4B:
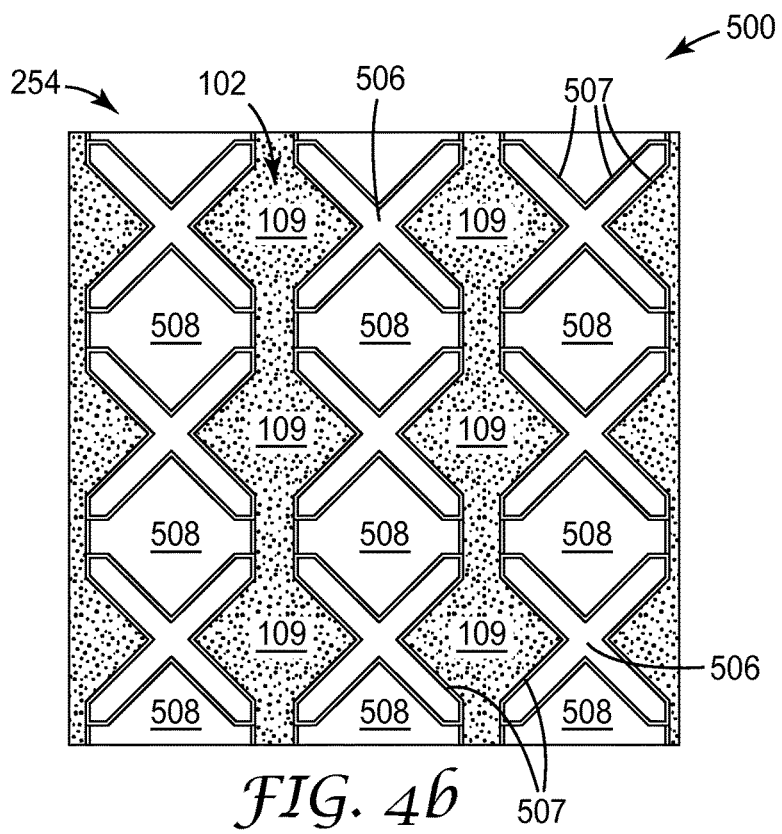

FIGS. 4a and 4b are plan views of the first and second electrically connected layers 252,254 of a capacitive touch sensor 500 according to a second embodiment of the present invention. The capacitive touch sensor 500 of the second embodiment is structurally similar to the matrix sensor 304 of the first embodiment, except for the first and second electrically connected layers and these differences will be elaborated upon. Like the first embodiment, the first electrically connected layer 252 includes the array of drive electrodes 100 and the second electrically connected layer 254 includes the array of sense electrodes 102. Further, the first electrically connected layer 252 of the touch sensor 500 includes a plurality of first non-electrically connected electrodes 504 which correspond to respective first non-overlapping regions 113 The first non-electrically connected electrodes 504 are similar to the non-electrically connected electrodes 402 of the first embodiment (i.e. generally X-shape). However, first electrically connected layer 252 of the second embodiment further includes supplemental non-electrically connected electrode portions 502 which correspond to portion V4 of second non-overlapping regions 114 and are in registration with respective sense electrodes 102 (and more specifically the conductive pads 109) of the second electrically connected layer 254. In other words, the supplemental non-electrically connected electrode portions 502 also have a generally diamond shape structure similar to the shape of the sense electrodes 102.

In the second embodiment, the first non-electrically connected electrodes 504 are separated from adjacent supplemental non-electrically connected electrode portions 502 as well as adjacent conductive pads 106 via a perimeter gap 503, which has a width similar to the perimeter gap 404 as described in the first embodiment. It should also be appreciated that the first non-electrically connected electrodes 504 and the supplemental non-electrically connected electrode portions 502 are formed of the same material, and have the same thickness and refractive index as the array of drive electrodes 100.

Further, the capacitive touch sensor 500 includes second non-electrically connected electrodes 506 at the second electrically connected layer 254 (i.e. the same layer as the sense electrodes 102) and which corresponds to first non-overlapping regions 113. Specifically, the second non-electrically connected electrodes 506 are also generally X-shape. Second electrically connected layer 254 further includes supplemental non-electrically connected electrode portions 508 which correspond to V1 portions of second non-overlapping regions 114 and are in registration with respective drive electrodes 100 (more specifically, the conductive pads 106) of the first electrically connected layer 252. Just like the first non-electrically connected electrodes 504, the second non-electrically connected electrodes 506 are separated from adjacent supplemental non-electrically connected electrode portions 508 as well as adjacent conductive pads 109 via a perimeter gap 507, which has a width similar to the perimeter gap 404 as described in the first embodiment. It should also be appreciated that the second non-electrically connected electrodes 506 and the supplemental non-electrically connected electrode portions 508 are formed of the same material, and have the same thickness and refractive index as the array of sense electrodes 102.

With such an arrangement, because the first and second non-electrically connected electrodes 504,506 and supplemental non-electrically connected electrode portions 502, 508 are electrically not connected, the presence of these electrodes do not interfere with the normal operation of the drive and sense electrodes 100,102. Yet, the provision of such first and second non-electrically connected electrodes and supplemental non-electrically connected electrode portions is able to reduce the optical contrast or variations between the various regions of the capacitive touch sensor 500. In this arrangement, the X-shaped first non-electrically connected electrodes 504 in the first electrically connected layer 252 is in registration with the X-shaped second non-electrically connected electrode 506 of the second electrically connected layer 254.

Figure 5A:
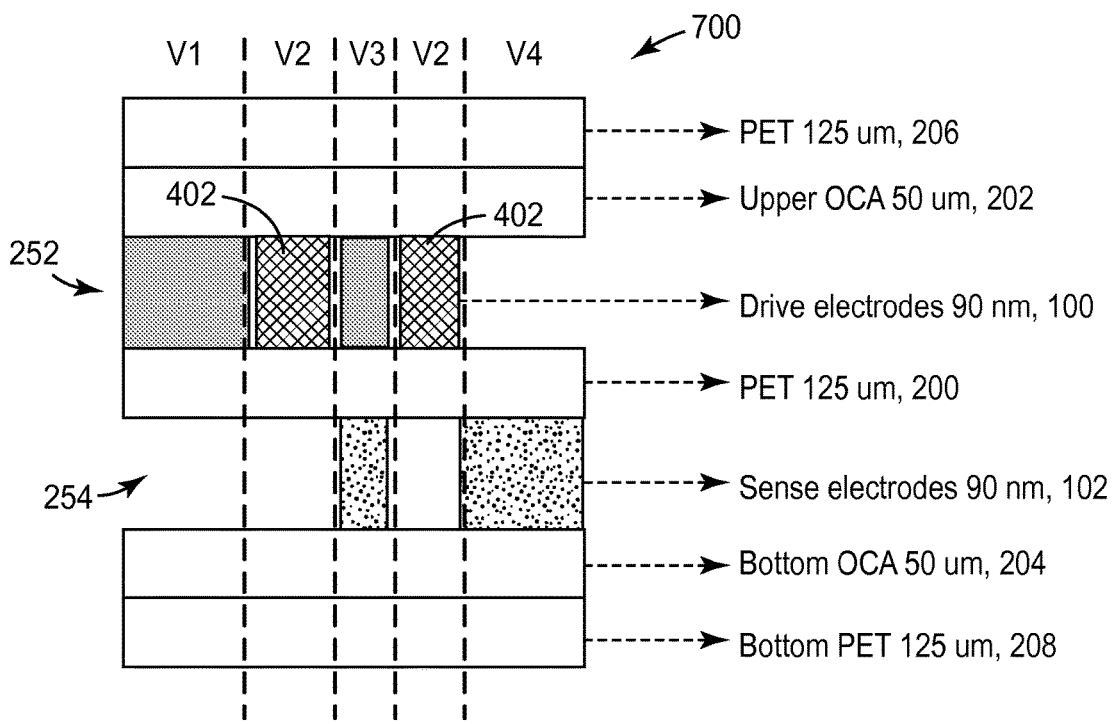
Figure 5B:
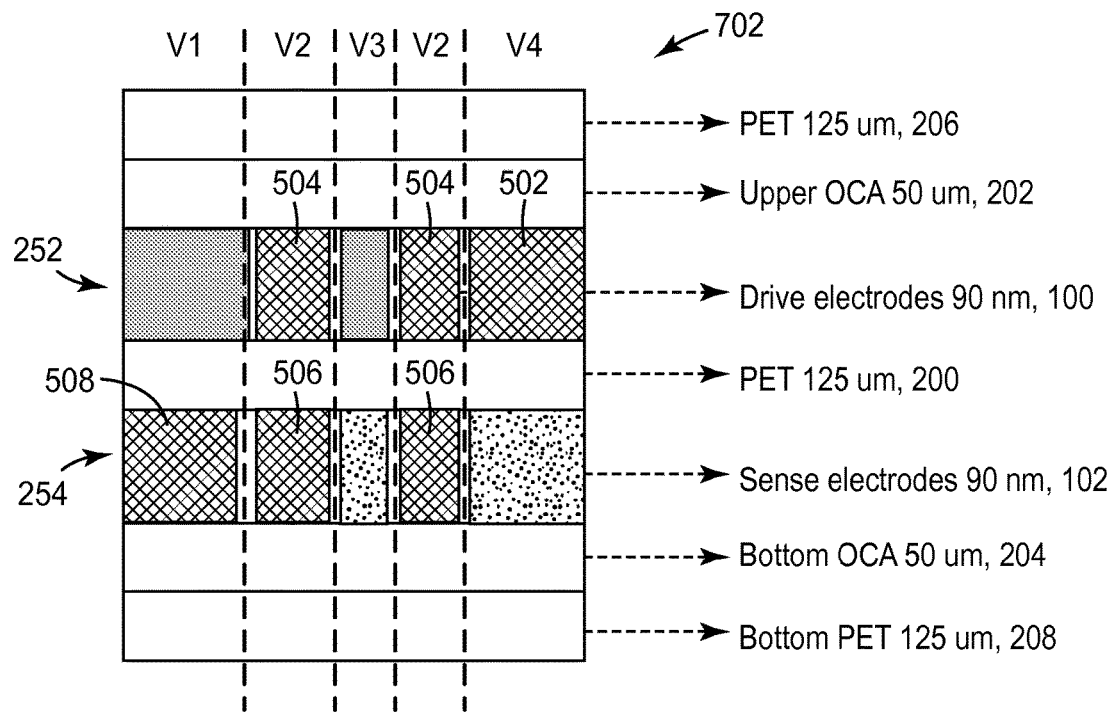

As an experimental illustration, a first test matrix sensor 700 and a second test matrix sensor 702 are fabricated based on the first (FIGS. 3a and 3b) and second (FIGS. 4a and 4b) embodiments respectively, and compared with a control matrix sensor which is conventional, i.e., without the pattern-concealing designs as disclosed herein. Fabricating or manufacturing of the first and second test matrix sensors 700,702 are similar to what has been described earlier in the first and second embodiments and for the ease of explanation, elements of the prior art matrix sensor 104 of FIG. 2 will be used to explain the structure of the first and second test matrix sensors 700,702 (including using the same reference numerals as those of FIG. 2). To elaborate, fabricating the first and second test matrix sensors 700,702 involves forming the arrays of drive and sense electrodes 100, 102 (as well as non-electrically connected electrodes 402 for matrix sensor 700 and non-electrically connected electrodes 504, 506 and supplemental non-electrically connected electrode portions 502,508 for matrix sensor 702) on opposing sides of a transparent middle PET layer 200 and thereafter laminating the middle PET layer 200 and ITO layers 100, 102 with respective upper and bottom OCA layers 202, 204, as shown in FIGS. 5a and 5b which are respective cross-section views of the first and second test matrix sensors 700,702 (and again the layers are not shown to scale). Thereafter, a top PET layer 206 and a bottom PET layer 208 are laminated to the upper and bottom OCA layers 202,204, respectively. Again, it should be appreciated that the respective layers of the test matrix sensors 700,702 in FIGS. 5a and 5b correspond to the same layers as shown in FIG. 2. In the experimental illustrations, in each test matrix sensor 700, 702, the top PET layer 206 is 125 um thick, the upper OCA layer 202 is 50 um thick, the array of drive electrodes 100 (i.e. the first electrically connected layer 252) is 90 nm thick, the middle PET layer 200 is 125 um thick, the array of sense electrode 102 (i.e. the second electrically connected layer 254) is 90 nm thick, the bottom OCA layer 204 is 50 um thick, and the bottom PET layer 208 is 125 um thick. It should be appreciated that the top PET layer 206 may be replaced by a glass layer (typically the case for touch sensors) which may be 0.8 mm thick. Other thicknesses of each layer may be used as appropriate for specific embodiments.

Referring to FIGS. 5a and 5b, a difference between the first and second test matrix sensors 700,702 is that for the first test matrix, the first electrically connected layer 252 includes the non-electrically connected electrodes 402 just like the first embodiment, i.e. between the array of drive electrodes, as shown in FIG. 3a; whereas the second test matrix sensor 702 is configured with the first and second electrically connected layers 252,254 in the same way as the second embodiment, as shown in FIGS. 4a and 4b, i.e. non-electrically connected electrodes 504,506 with adjacent supplemental non-electrically connected electrode portions 502,508 provided on both electrically connected layers and aligned or in registration with respective sense electrodes 102 or drive electrodes 100.

Table 2 below shows experimental results obtained from the test matrix sensors of FIGS. 5a and 5b:

TABLE 2

| Sensor type | Area per touch node (sq mm) | | | | L | a | b | T % at 550 nm | Visibility |
|---|---|---|---|---|---|---|---|---|---|
| | V1 | V2 | V3 | V4 | | | | | |
| Control | 14.728 | 10.56 | 1.21 | 14.728 | 96.37 | −0.41 | 4.24 | 87.41 | Visible |
| Design 2 | 22.408 | 2.88 | 1.21 | 14.728 | 96.3 | −0.54 | 4.86 | 87.29 | Concealed |
| Design 3 | 2.2 | 2.88 | 33.906 | 2.2 | 96.16 | −0.98 | 6.1 | 86.26 | Barely visible |

In Table 2, the Design 2 Sensor type corresponds to the first pattern-concealing test matrix sensor 700 (i.e. the first embodiment) and the Design 3 Sensor type corresponds to the second pattern-concealing test matrix sensor 702 (i.e. the second embodiment). It is also to be noted that the perimeter gaps 404,503,507 separating the respective non-electrically connected electrodes 402,504,506 and electrically connected electrodes 100, 102 is approximately 100 um for both the test matrix sensors manufactured based on Design 2 and Design 3, whereas the conventional control sensor ("Control" in Table 2) is without the non-electrically connected electrodes 402,504,506 and the corresponding perimeter gaps 404,503,507.

Additionally, as shown in Table 2, the ratios of the V1 to V4 portions, as afore described with reference to FIG. 2, were also adjusted for the Design 2 and Design 3 Sensor types. Specifically for Design 2, the amount of "exposed" PET of the middle PET layer 200 in the first electrically connected layer 252 is about 6.98% due to the presence of the non-electrically connected electrodes 402, compared to the Control sensor which has about 61% exposed for the same layer. "Exposed" is understood to mean the area of the middle PET layer 200 which is not covered by the drive/sense electrodes 100,102 or the non-electrically connected electrodes 402. This also means that the exposed PET of the middle PET layer 200 in the second electrically connected layer 254 would be similar to that of the "Control" sensor and in this experiment, that is, about 61%. It was found that the arrangement proposed in Design 2 helps to conceal the electrode pattern for the first test matrix sensor 700 as is indicated on the right hand side of Table 2.

Tuning to Design 3, due to the presence of the non-electrically connected electrodes 504,506 and supplemental non-electrically connected electrode portions 502,508 in the first and second electrically connected layers 252,254, the amount of exposed PET of the middle PET layer 200 in the first and second electrically connected layers 252,254 is about 6.98% (compared to the Control design which is about 61% for the two layers). As illustrated in the right hand side of Table 2, this results in a "barely visible" electrode pattern for the second test matrix sensor 702.

Embodiments of the present invention provide a cost-effective and reliable way of lowering the pattern visibility of the transparent electrodes (i.e. electrically connected electrodes) 100, 102 that have been layered over each other producing a matrix pattern for forming the sensor matrix 104 as afore described. Advantageously, the contrast between the transparent electrodes and base substrate is particularly minimised by disposing non-electrically connected electrodes as proposed.

The described embodiment(s) should not be construed as limitative. For example, in the first embodiment, the non-electrically connected electrodes 402 may alternatively be arranged in the second electrically connected layer 254 (i.e. same layer as the sense electrodes 102). In a further alternative the non-electrically connected electrodes 402 may be disposed on both the first and second electrically connected layers 252,254.

Similarly, for the second embodiment, it may not be necessary for both the first and second electrically connected layers 252,254 to have the non-electrically connected electrodes 504,506 and it is envisaged that the non-electrically connected electrodes may just be arranged on one of the two electrically connected layers 252,254. Also, it may not be necessary that all the non-electrically connected electrodes 504,506 have supplemental non-electrically connected electrode portions 502,508 and having only some of them is possible.

In the described embodiments, the array of drive and sense electrodes 100,102 have diamond-shaped or -patterned conductive pads 106,109 but it should be appreciated that other shapes, for example a bar pattern, may be used as long as the shapes comply with electronics and programming of the particular sensor construction. If a bar pattern is used, the array of drive electrodes may be arranged below the array of sense electrodes for better LCD noise protection.

Other materials may be used as the dielectric substrate not just PET, and other suitable materials may be OCA, glass, etc.

Figure 6A:
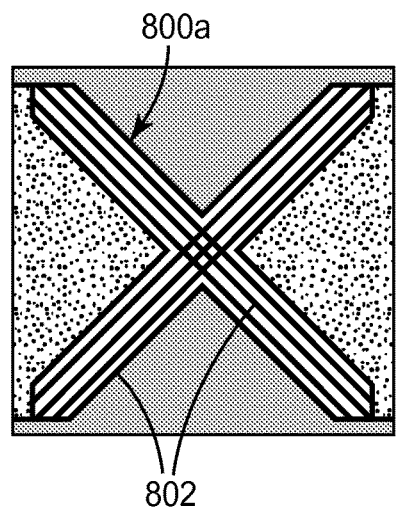
FIGS. 6a to 6c show variations of non-electrically connected electrodes compared to those illustrated in FIGS. 3a and 4a/4b.
Figure 6B:
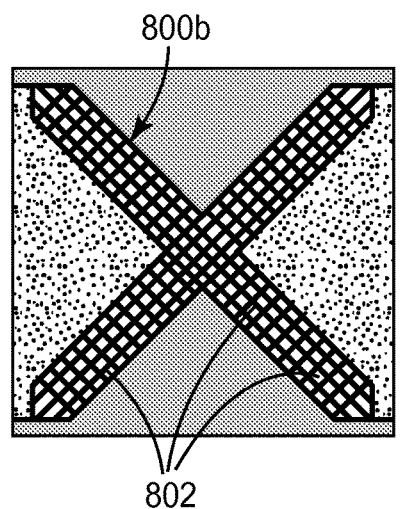
Figure 6C:
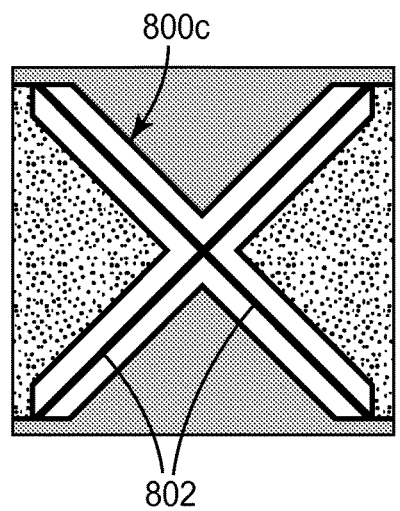

Further, in the first and second embodiments, the non-electrically connected electrodes 402,504,506, in particular within the individual X-shaped portions, are described to be continuous. It is possible that the individual non-electrically connected electrodes 402,504,506 are segmented into small portions of any preferred shape such as those illustrated in non-electrically connected electrodes 800*a*, 800*b*, 800*c* shown in FIGS. 6*a* to 6*c*, respectively. These variations include elongate gaps 802 to divide the non-electrically connected electrodes into smaller portions (for example, mesh design as in FIG. 6*b*), which advantageously eliminate formation of fringe capacitance when the sensor matrix 304 is being used in conjunction with fingers or a stylus, and yet reduce the visibility issue. It should be appreciated that the width of these elongate gaps 802 should be about 100 um or less, just like the perimeter gap. Particularly, the width of the elongate gaps 802 may be between approximately 20 um and 100 um, or the width may be between 25 um and 90 um. In this exemplary embodiment, the width is approximately 30 um wide.

In the described embodiments, the array of drive and sense electrodes 100,102 are formed on the same substrate 200 but it is envisaged that the drive and sense electrodes 100,102 may be formed on different substrates and then laminated together. Accordingly, the non-electrically connected electrodes 402,504,506 may be arranged on a same layer as one of the electrically connected electrodes, or on both layers of the electrodes. Furthermore, the non-electrically connected electrodes 402,504,506 need not be necessarily formed of the same material, thickness and refractive index as the electrically connected electrodes 100, 102 as afore described; those parameters may suitably be varied. Also, clear adhesive may optionally be used to laminate the arrays of drive and sense electrodes 100, 102 according to any preferred methods such as the Face-in, Face-out or Face in-out methods if the drive and sense electrodes are formed on different substrates.

In at least one embodiment of the present invention, it is preferred that the top PET 206, the upper OCA 202, the drive electrodes 100, the middle PET substrate 200, the sense electrodes 102, the bottom OCA 204, and the bottom PET 208 are all substantially transparent, although it is envisaged that they may have different levels of transparency relative to one another.

Additionally, the non-electrically connected electrode 402 shown in FIG. 3a and the X-shape non-electrically connected electrodes 504,506 shown in FIGS. 4a and 4b may also be formed as other shapes such as square, rectangular or the like, and not limited to the X-shape.

While the invention has been illustrated and described in detail in the drawings and foregoing description, such illustration and description are to be considered illustrative or exemplary, and not restrictive; the invention is not limited to the disclosed embodiments. Other variations to the disclosed embodiments can be understood and effected by those skilled in the art in practising the claimed invention.

The invention claimed is:

1. A capacitive touch screen sensor comprising:
   (i) an array of drive electrodes;
   (ii) an array of sense electrodes separated from the array of drive electrodes by a dielectric layer, each sense electrode being offset from each drive electrode to define respective overlapping regions and first non-overlapping regions, the drive electrodes not overlapping with the first non-overlapping regions and the sense electrodes not overlapping with the first non-overlapping regions, each drive electrode comprising a plurality of first conductive pads, each sense electrode comprising a plurality of second conductive pads, the first and second conductive pads having a substantially same shape and size; and
   (iii) a plurality of non-electrically connected electrodes within the first non-overlapping regions, each non-electrically connected electrode being arranged to correspond to each first non-overlapping region and spaced from adjacent drive or sense electrodes by a perimeter gap, wherein the perimeter gap has a width of about 100 micrometers or less,
   wherein each non-electrically connected electrode has a generally X-shape, wherein the perimeter gap is configured to space the generally X-shape non-electrically connected electrodes from adjacent drive or sense electrodes, and
   wherein each non-electrically connected electrode comprises a plurality of elongate gaps dividing the non-electrically connected electrode into smaller portions and defining a mesh pattern.

2. A capacitive touch screen sensor according to claim 1, wherein the width is between 20 micrometers and 100 micrometers.

3. A capacitive touch screen sensor according to claim 1, wherein the width is about 30 micrometers.

4. A capacitive touch screen sensor according to claim 1, wherein the array of drive electrodes and the array of sense electrodes are arranged on opposing first and second surfaces of a same substrate.

5. A capacitive touch screen sensor according to claim 4, wherein the plurality of non-electrically connected electrodes is arranged on one of the opposing surfaces.

6. A capacitive touch screen sensor according to claim 5, wherein the plurality of non-electrically connected electrodes is arranged on the same surface as the array of drive electrodes, and further comprising at least one supplemental non-electrically connected electrode portion which is in a second non-overlapping region and in registration with corresponding sense electrodes.

7. A capacitive touch screen sensor according to claim 5, wherein the plurality of non-electrically connected electrodes is arranged on the same surface as the array of sense electrodes, and further comprising at least one supplemental non-electrically connected electrode portion which is in a second non-overlapping region and in registration with a corresponding drive electrode.

8. A capacitive touch screen sensor according to claim 4, wherein the plurality of non-electrically connected electrodes is arranged on both of the opposing surfaces.

9. A capacitive touch screen sensor according to claim 1, wherein the array of drive electrodes and the array of sense electrodes are arranged on surfaces of different substrates.

10. A capacitive touch screen sensor according to claim 9, wherein the plurality of non-electrically connected electrodes is arranged on one of the surfaces.

11. A capacitive touch screen sensor according to claim 10, wherein the plurality of non-electrically connected electrodes is arranged on the same surface as the array of drive electrodes and further comprising at least one supplemental non-electrically connected electrode portion which is in a second non-overlapping region and in registration with a corresponding sense electrode.

12. A capacitive touch screen sensor according to claim 10, wherein the plurality of non-electrically connected electrodes is arranged on the same surface as the array of sense electrodes, and further comprising at least one supplemental non-electrically connected electrode portion which is in a second non-overlapping region and in registration with a corresponding drive electrode.

13. A capacitive touch screen sensor according to claim 9, wherein the plurality of non-electrically connected electrodes is arranged on both of the surfaces.

14. A capacitive touch screen sensor according to claim 1, wherein the drive and sense electrodes and the non-electrically connected electrodes comprise one or more of Zinc Oxide (ZnO), Tin(II) Oxide (SnO), Indium Oxide (InO), Indium Zinc Oxide (IZO), Graphene, and Indium Tin Oxide (ITO).

15. A capacitive touch screen sensor according to claim 1, wherein separation distance between the array of drive electrodes and the array of sense electrodes is about 50 micrometers to 175 micrometers.

16. A capacitive touch sensitive device, comprising the capacitive touch screen sensor of claim 1.

17. A method of fabricating a capacitive touch screen sensor, comprising:
   (i) forming an array of drive electrodes;
   (ii) forming an array of sense electrodes separated from the array of drive electrodes by a dielectric layer, each sense electrode being offset from each drive electrode to define respective overlapping regions and first non-overlapping regions, the drive electrodes not overlapping with the first non-overlapping regions and the sense electrodes not overlapping with the first non-overlapping regions, each drive electrode comprising a plurality of first conductive pads, each sense electrode comprising a plurality of second conductive pads, the first and second conductive pads having a substantially same shape and size; and (iii) forming a plurality of non-electrically connected electrodes within the first non-overlapping regions with each non-electrically connected electrode arranged to correspond to each first non-overlapping region and spaced from adjacent drive or sense electrodes by a perimeter gap; wherein the perimeter gap has a width of about 100 micrometers or less, wherein each non-electrically connected electrode has a generally X-shape, wherein the perimeter gap is configured to space the generally X-shape non-electrically connected electrodes from adjacent drive or sense electrodes, and wherein each non-electrically connected electrode comprises a plurality of elongate gaps dividing the non-electrically connected electrode into smaller portions and defining a mesh pattern.

18. A capacitive touch screen sensor comprising:
(i) an array of first electrodes disposed on a first surface;
(ii) an array of second electrodes separated from the array of first electrodes by a dielectric layer, the array of second electrodes being disposed on a different second surface, each second electrode being offset from each first electrode to define respective overlapping regions and first non-overlapping regions, the first electrodes not overlapping with the first non-overlapping regions and the second electrodes not overlapping with the first non-overlapping regions, each first electrode comprising a plurality of first conductive pads, each second electrode comprising a plurality of second conductive pads, the first and second conductive pads having a substantially same shape and size; and
(iii) a plurality of non-electrically connected electrodes within the first non-overlapping regions, the plurality of non-electrically connected electrodes disposed on the first surface, each non-electrically connected electrode being arranged to correspond to each first non-overlapping region and spaced from adjacent first or second electrodes by a perimeter gap, wherein the perimeter gap has a width of about 100 micrometers or less, wherein each non-electrically connected electrode is continuous and has a generally X-shape.

19. The capacitive touch screen sensor of claim 18 further comprising at least one supplemental non-electrically connected electrode portion disposed on the first surface and separated from adjacent first electrodes, each supplemental non-electrically connected electrode portion being in registration with and overlapping a second electrode in the plurality of second electrodes.

20. The capacitive touch screen sensor of claim 18, wherein the first and second surfaces are surfaces of different substrates.

21. The capacitive touch screen sensor of claim 18, wherein the first and second surfaces are opposing surfaces of a same substrate.

22. A capacitive touch sensitive device, comprising the capacitive touch screen sensor of claim 18.

* * * * *